US012196382B1

(12) United States Patent
Jiang

(10) Patent No.: US 12,196,382 B1
(45) Date of Patent: Jan. 14, 2025

(54) CANDLE WICK PART AND CANDLE LAMP

(71) Applicant: Caifa Jiang, Hunan (CN)

(72) Inventor: Caifa Jiang, Hunan (CN)

( * ) Notice: Subject to any disclaimer, the term of this patent is extended or adjusted under 35 U.S.C. 154(b) by 0 days.

(21) Appl. No.: 18/401,709

(22) Filed: Jan. 2, 2024

(51) Int. Cl.
*F21S 10/04* (2006.01)
*F21V 23/04* (2006.01)
*F21Y 113/17* (2016.01)

(52) U.S. Cl.
CPC ........ *F21S 10/043* (2013.01); *F21V 23/0435* (2013.01); *F21Y 2113/17* (2016.08)

(58) Field of Classification Search
CPC ..... F21S 10/04; F21S 10/043; F21V 23/0435; F21Y 2113/12; F21Y 2113/17
See application file for complete search history.

(56) References Cited

U.S. PATENT DOCUMENTS

| | | | | |
|---|---|---|---|---|
| 9,860,953 | B2 * | 1/2018 | Li | H05B 47/16 |
| 10,184,625 | B1 * | 1/2019 | Lauer | F21V 13/14 |
| 10,539,301 | B2 * | 1/2020 | Li | F21S 6/001 |
| 11,085,602 | B2 * | 8/2021 | Van Bommel | H05B 45/20 |
| 11,761,598 | B2 * | 9/2023 | Zhang | F21S 6/001 362/227 |

FOREIGN PATENT DOCUMENTS

| | | | | |
|---|---|---|---|---|
| CN | 110173655 | * | 8/2019 | |
| FR | 2914487 A1 | * | 10/2008 | F21S 13/12 |
| FR | 2972520 A1 | * | 9/2012 | F21K 9/00 |

OTHER PUBLICATIONS

CN 110173655, Stephen Joseph Lung, Aug. 27, 2019, English Translation (Year: 2019).*

* cited by examiner

*Primary Examiner* — Zheng Song
*Assistant Examiner* — Glenn D Zimmerman
(74) *Attorney, Agent, or Firm* — Hawaii Patent Services; Nathaniel K. Fedde; Kenton N. Fedde

(57) ABSTRACT

A candle wick part and a candle lamp comprise a lamp panel, wherein the lamp panel comprises a light-emitting part, and the width of the upper part of the light-emitting part is gradually reduced from bottom to top, wherein a plurality of lamp bead chips are arranged on the light-emitting part; and the lamp bead chips are covered with a translucent epoxy resin encapsulation layer and the middle part of the epoxy resin encapsulation layer is high and the periphery is low; the switching times of the lamp bead chips are different, and they are lighted up to form the shape of a flame; the candle lamp made of this wick part emits light more evenly on both sides and looks more realistic.

6 Claims, 12 Drawing Sheets

CANDLE WICK PART AND CANDLE LAMP

TECHNICAL FIELD

The present invention relates to the technical field of decorative candles, in particular to a candle wick part and a candle lamp.

BACKGROUND

In today's daily life, fluorescent lamps, LED lamps and desk lamps have replaced candles as the mainstream lighting appliances, but there is still a demand for candles in the market, such as creating an atmosphere or based on nostalgia and other consumer psychology. With the progress of social science and technology and based on safety considerations, candles that used to rely on burning to emit light are gradually replaced by safer simulated candle lamps.

However, most of the traditional decorative candle lamps use a single light bulb wick part to simulate candles, and the candle lamp is projected on the sheet with a magnetic swing mechanism to simulate the flickering effect of candles, which makes the candle lamp only have a candle shape and no flame dynamic effect, and the interior of the lamp will emit light, and the back of the projection object is dark and the mechanism is complicated.

China patent with application number of 201010211402.8 discloses an electronic light-emitting device and a method for simulating real fire. An LED lamp bead is projected on a sheet with a flame shape, and at the same time, a mechanism capable of generating magnetic force to drive the sheet to swing is added inside, so that the sheet can swing back and forth, thereby simulating the flickering effect of candlelight.

The design of this candle lamp is ingenious, and the candlelight can move. However, because a single lamp bead projects light, the interior of the lamp will also emit light, unlike a real candle, which only emits light in the wick part. At the same time, because the light can only be projected to a single surface, the impression on the back will be worse than that on the front, and the swinging mechanism and the chip are difficult to assemble and easy to be damaged.

Based on the above problems, the field needs a flameless candle lamp which is aesthetically similar to the traditional candle. The candle lamp not only has a candle shape, but also has a flame dynamic effect. At the same time, the luminous body has the advantages of almost no graininess, high degree of simulation, simple structure and easy production and maintenance, which makes the candle lamp have a good viewing effect and further improves the user's experience.

SUMMARY

The present invention provides a candle wick part, wherein, the lamp panel comprises a substrate and a light-emitting part, the light-emitting part is arranged at one end of the substrate, and a width of an upper part of the light-emitting part is gradually reduced from bottom to top; and wherein, a plurality of lamp bead chips is arranged on one side of the light-emitting part, and the lamp bead chips are covered with a translucent epoxy resin encapsulation layer; and wherein said epoxy resin encapsulation layer is high in a middle part and low in a periphery; the epoxy resin encapsulation layer is flexible; the light-emitting part, the lamp bead chips, and the epoxy resin encapsulation layer are closely combined without gaps; and wherein the lamp bead chips have different switching times and are lighted up to form a flame shape.

The present invention further provides a candle wick part, wherein, the lamp panel comprises a substrate and a light-emitting part; the light-emitting part is arranged at one end of the substrate, and a width of an upper part of the light-emitting part is gradually reduced from bottom to top; and wherein, a plurality of lamp bead chips is arranged on one side of the light-emitting part, and the lamp bead chips are covered with a translucent epoxy resin encapsulation layer; and wherein said epoxy resin encapsulation layer is high in a middle part and low in a periphery; the epoxy resin encapsulation layer is flexible; the light-emitting part, the lamp bead chips, and the epoxy resin encapsulation layer are closely combined without gaps; and wherein, a wick part is also arranged between the substrate and the light-emitting part; and wherein the lamp bead chips have different switching times and are lighted up to form a fire shape.

The present invention also provides a candle lamp, which includes a main body and a candle wick part.

wherein a top of the main body is provided with an arc-shaped concave cavity, and the inside of the main body is provided with a cavity for accommodating a candle wick part; and wherein, the candle wick part comprises a lamp panel, and the lamp panel comprises a substrate and a light-emitting part; the light-emitting part is arranged at one end of the substrate, and a width of an upper part of the light-emitting part is gradually reduced from bottom to top; and wherein, one side of the light-emitting part is provided with a plurality of lamp bead chips, and the lamp bead chips are covered with a translucent epoxy resin encapsulation layer; and wherein said epoxy resin encapsulation layer is high in a middle part and low in a periphery, and the epoxy resin encapsulation layer is flexible; the light-emitting part, the lamp bead chips, and the epoxy resin encapsulation layer are closely combined without gaps; and wherein the lamp bead chips have different switching times, and are lighted up to form a fire shape; and the candle wick part is arranged in the cavity, and the light-emitting part is exposed outside a middle part of the arc-shaped concave cavity; and the cavity is further provided with a power supply component for providing electric energy for the candle wick part.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
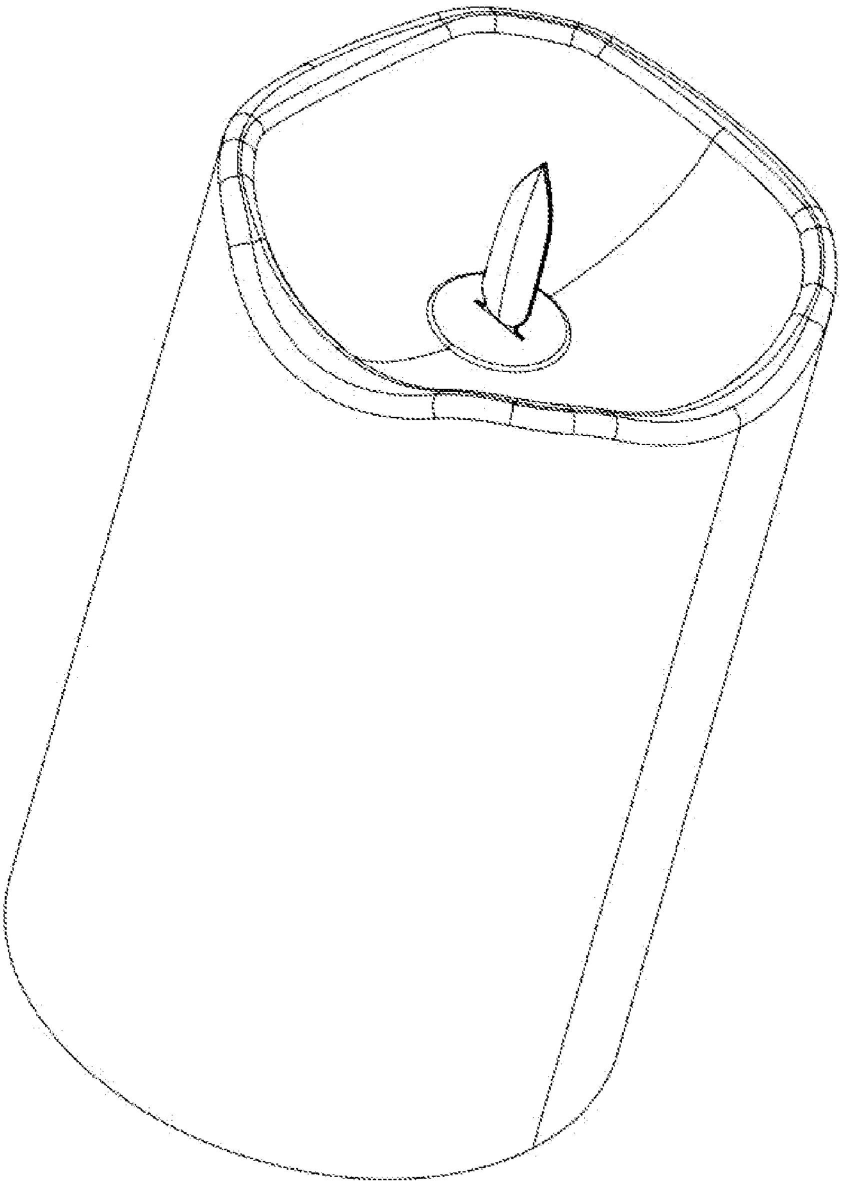
FIG. 1 is a schematic diagram of a candle lamp in the application of the present invention.
Figure 2:
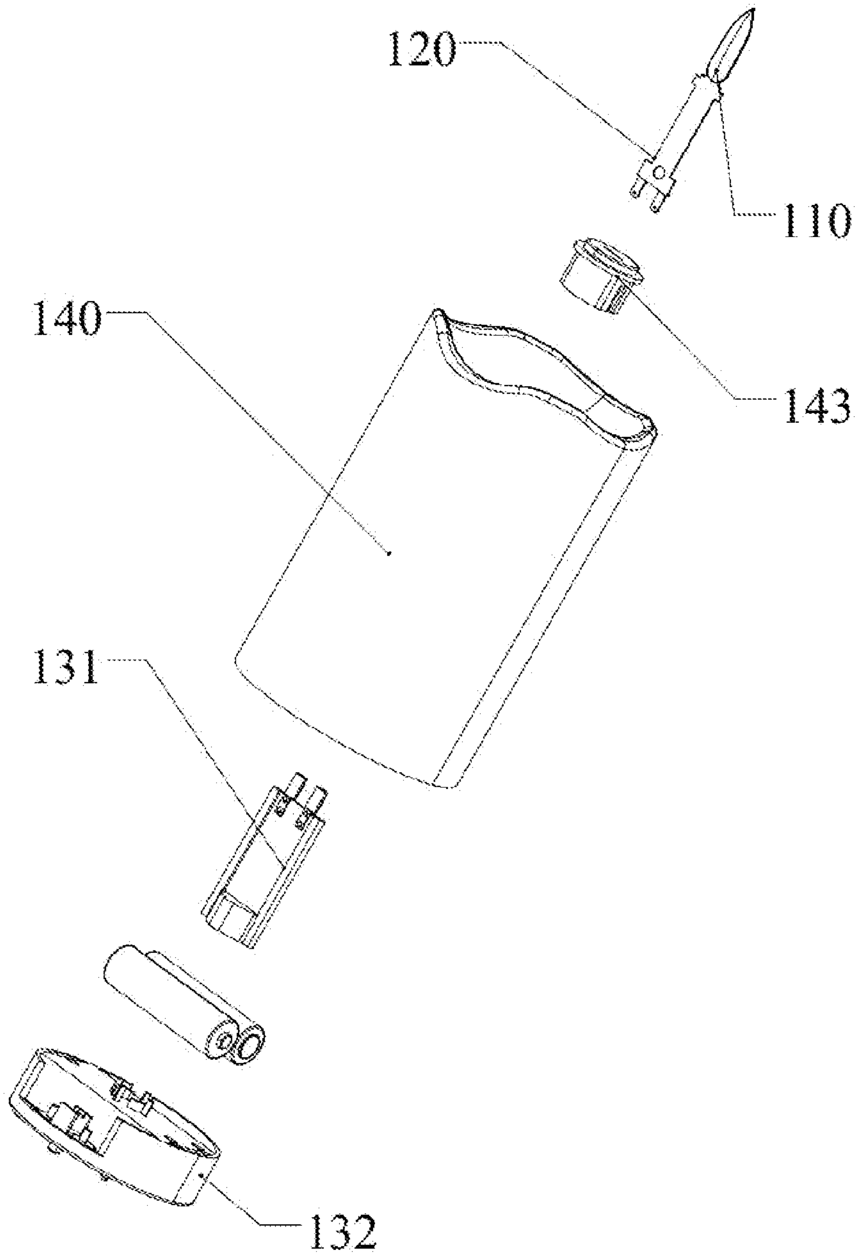
FIG. 2 is an exploded view of the candle lamp in the application of the present invention.

Lamp panel (100); Light-emitting part (110); Lamp bead chip (111); Epoxy resin encapsulation layer (112); Wick part (113); Second epoxy resin encapsulation layer (114); Substrate (120); Pin (121); Slot (122); Control chip (123); Signal receiving chip (124); Groove (125); Power supply component (130); Support plate (131); Power base (132); Battery compartment (133); Power switch (134); Main body (140); Arc cavity (141); Cavity (142); Fixing block (143); Through hole (144).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, in order to make the candle lamp have both candle modeling and flame dynamic effect, and at the same time, the light-emitting body has almost no graininess when emitting light, and the simulation degree is high, so as to improve the viewing effect, the application of the present invention provides a candle lamp.

Referring to FIGS. 1 to 4, a candle wick part includes a lamp panel 100, wherein the lamp panel 100 includes a substrate 120 and a light-emitting part 110.

Figure 4:
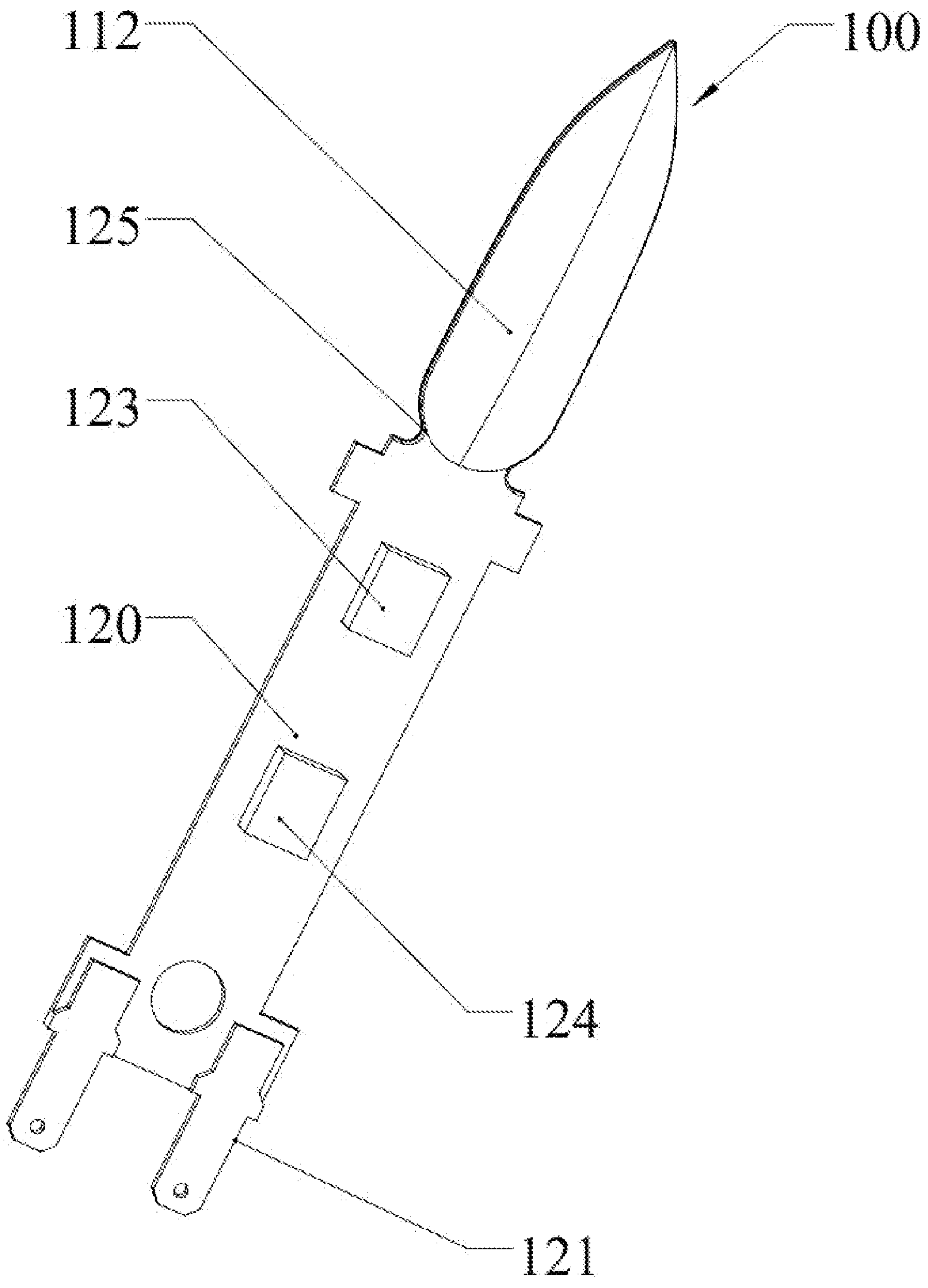
FIG. 4 is a schematic diagram of a candle wick part in the application of the present invention.

Referring to FIG. 4, the light-emitting part 110 is disposed at one end of the substrate 120.

Figure 3:
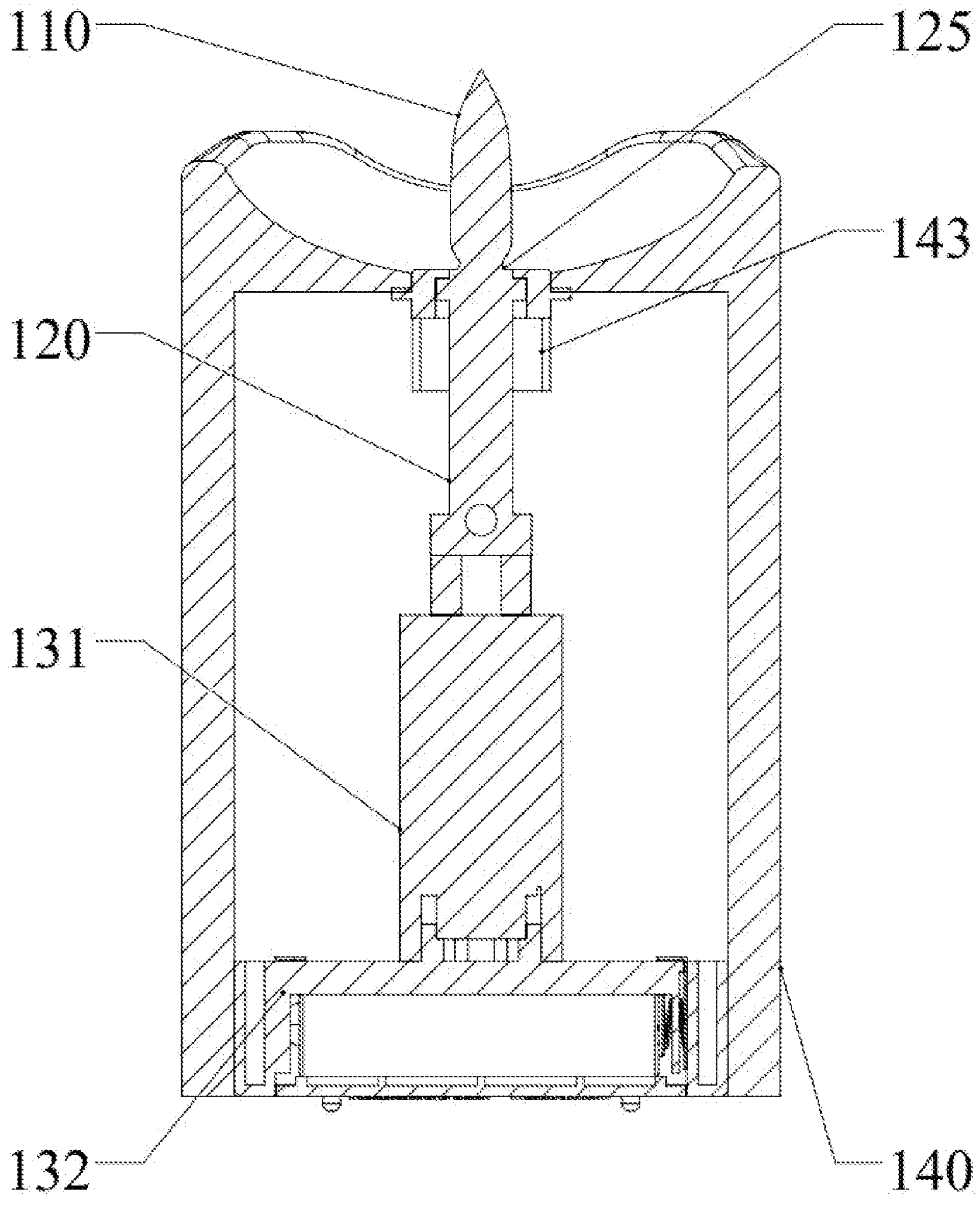
FIG. 3 is a sectional view of the candle lamp in the application of the present invention.

In this embodiment, the state shown in FIG. 3 is a normal use state, and the light-emitting part 110 is above the substrate 120.

The width of the upper part of the light-emitting part 110 gradually decreases from bottom to top. The shape of the light-emitting part 110 is similar to that of a flame, thereby improving the visual effect.

Figure 5:
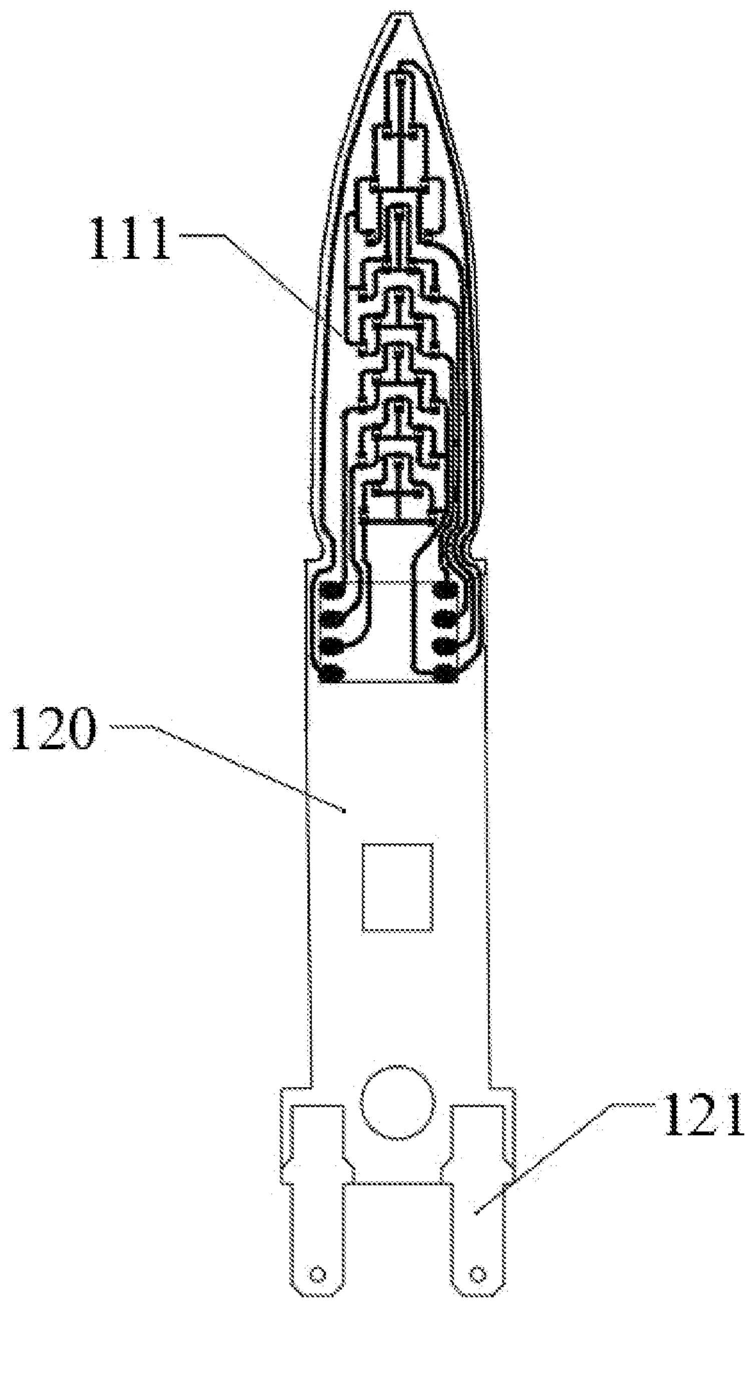
FIG. 5 is a schematic diagram of a candle wick part in the application of the present invention.

Referring to FIG. 5, further, one surface of the light-emitting part 110 is provided with a plurality of lamp bead chips 111, and the lamp bead chips 111 are arranged in a staggered manner. In this embodiment, the lamp bead chip 111 is an LED lamp bead. The lamp bead chips 111 are arranged vertically, and the switching times of the lamp bead chips 111 are different, and the brightness is gradually transmitted. That is, the lamp bead chips 111 at the top emits light, but the lamp bead chips 111 at the bottom does not. When the lower lamp bead chips 111 emits light, the light of the top lamp bead chips 111 gradually weakens, and light is emitted in an alternating way, and forms a flame shape after lighting, so that the candle lamp has a flame dynamic effect.

In some embodiments, the lamp bead chips 111 can be distributed on the front and back surfaces of the light-emitting part 110, and the lamp bead chips 111 on the two surfaces are arranged in a staggered manner, that is, the lamp bead chips 111 on the back surface are distributed between two adjacent lamp bead chips 111 on the front surface, so that the light emitted from the front and back surfaces of the light-emitting part 110 is uniform, the simulation degree is high, and the visual effect is good. Meanwhile, the types of the lamp bead chip 111 include but are not limited to point-controlled RGB lamps, point-controlled RGB lamps, light bulbs, light strips, line lamps and other components that can emit light.

Figure 7:
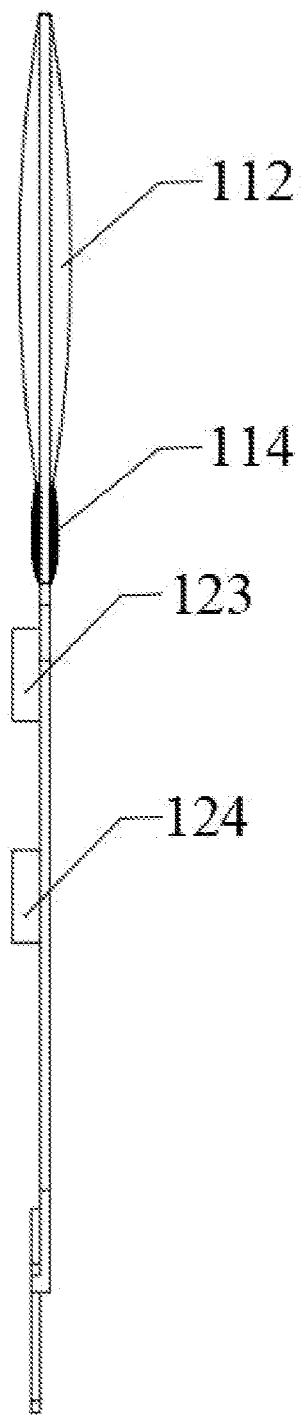
FIG. 7 is a schematic diagram of a candle wick part in the application of the present invention.
Figure 8:
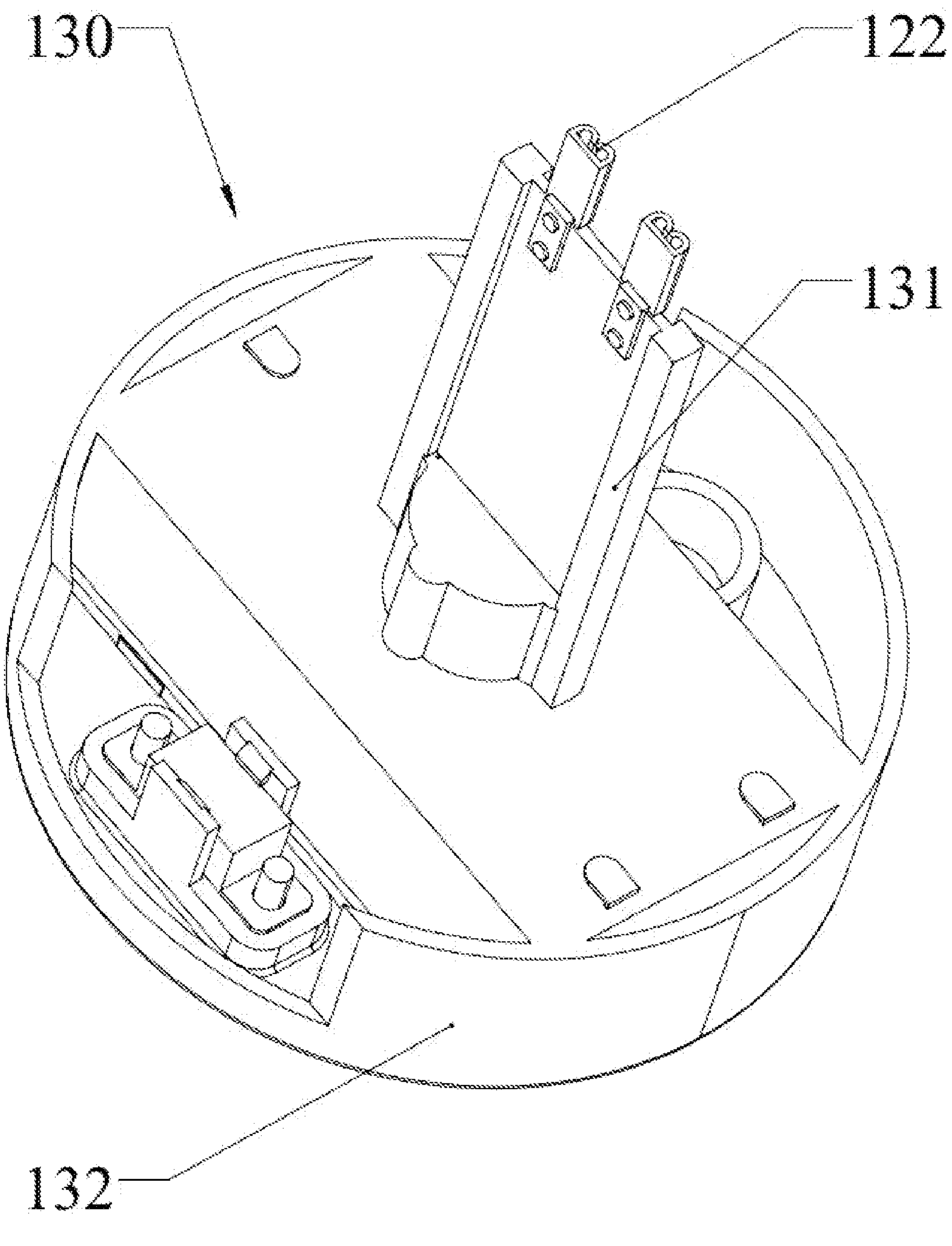
FIG. 8 is a schematic diagram of the power supply component in the application of the present invention.

Further, as shown in FIGS. 4 and 7, in this embodiment, the lamp bead chip 111 is covered with a translucent epoxy resin encapsulation layer 112, which is high in the middle and low in the periphery, and flexible. The epoxy resin encapsulation layer 112 covers the lamp bead chips 111, so that the light-emitting part 110, the lamp bead chips 111 and the epoxy resin encapsulation layer 112 are closely combined without gaps.

In other embodiments, the material covered on the lamp bead chip 111 is not limited to epoxy resin, but can also be silica gel material, IXPE foam, nitrile rubber, silica gel foam, microporous polyurethane foam (PU foam) and other materials with good sealing performance, so long as the covered material has good sealing performance, and it can closely adhere to the light-emitting part 110 and the lamp bead chips 111.

Referring to FIG. 4 and FIG. 5, the substrate 120 is connected below the light-emitting part 110, and the width of the lower part of the light-emitting part 110 is gradually reduced from top to bottom, and a groove 125 is formed at the transition with the substrate 120, so that the simulation degree of the light-emitting part 110 is further improved by changing the arrangement. In this embodiment, the substrate 120 is made of an opaque glass fiber board. In other embodiments, the substrate 120 may be made of PC, including but not limited to PC materials, or PS and other insulating and transparent materials.

The substrate 120 is provided with a control chip 123 and a signal receiving chip 124. Users can send signals through the remote-control device, and the signal receiving chip 124 will receive the signals and transmit them to the control chip 123, thus realizing remote control. In this embodiment, the remote-control device is not limited.

In other embodiments (not shown in the figure), the remote control device includes, but is not limited to, mobile phones, such as Apple's iPhone®, other portable electronic devices, such as Apple's iPod Touches®, Apple's iPad®, and the mobile device operating system based on Google's Android, and any other portable electronic device, including software, firmware, hardware or a combination thereof, which can at least receive signals, decode (if necessary) and exchange information with the server to verify information. Typical components of a mobile device may include, but are not limited to, permanent memory such as flash ROM, random access memory such as SRAM, camera, battery, LCD driver, display, cellular antenna, speaker, Bluetooth circuit and WIFI circuit, wherein the permanent memory may contain programs, applications and/or operating systems for mobile devices. The mobile device may be a key fob. Keycard, which can be a security token, is a small hardware device with built-in authentication mechanism, and it is used to manage and protect access to network services, data, provide access, and communicate with devices.

Meanwhile, in an additional or alternative embodiment (not shown in the figure), the remote-control device is configured to operatively communicate (e.g., wirelessly communicate) with one or more user devices (not shown), such as a general-purpose computer, a special-purpose computer, a laptop computer, a desktop computer, an integrated circuit, a mobile device, a smart phone, a tablet computer or other suitable computing devices. For example, the controller can wirelessly communicate with the user equipment through a suitable wireless network, such as a local area network (e.g., an intranet), a wide area network (e.g., the Internet), a low-power wireless network (e.g., low-power Bluetooth (BLE)), or some combination thereof, and may include any number of wired or wireless links. Generally speaking, communication on the network can be conducted through any type of wired or wireless connection, using various communication protocols (for example, TCP/IP, HTTP, SMTP, FTP), codes or formats (for example, HTML, XML), or protection schemes (for example, VPN, secure HTTP, SSL).

Further, the substrate 120 is provided with a variety of other chips, such as a storage chip and a memory chip, a control chip 123, a signal receiving chip 124; the storage chip and the memory chip and other chips form a chipset. Through each chip in the chipset, the candle lamp can have the functions of timing, remote control on and off, or light brightness adjustment, so that the candle lamp is more intelligent. At the same time, the chipset can communicate wirelessly with the user and generate signals according to the control instructions issued by the user, thus realizing the remote control of various functions of the candle lamp.

In other embodiments (not shown in the figure), the communication means can use any of a variety of communication standards, protocols and technologies, including, but are not limited to, global system for mobile communications (GSM), enhanced data GSM environment (EDGE), high-speed downlink packet access (HSDPA), wideband code division multiple access (W-CDMA), code division multiple access (CDMA), time division multiple access (TDMA), BLUETOOTH®, wireless fidelity (Wi-Fi) (for example, IEEE802.11a, IEEE802.11b, IEEE802.11g or IEEE802.11n), Voice over Internet Protocol (VOIP), Wi-MAX, email protocol (e.g., Internet Message Access Protocol (IMAP) and/or post office protocol (POP)), instant messaging (e.g., Extensible Messaging and Presence Protocol (XMPP), Session Initiation Protocol for Instant Messaging and Presence Leveraging Extensions (SIMPLE) or Instant Messaging Presence Services (IMPS), or Short Message Service (SMS), or any other suitable communication protocol, including those developed and not yet completed since the date of submission of this document.

Figure 6:
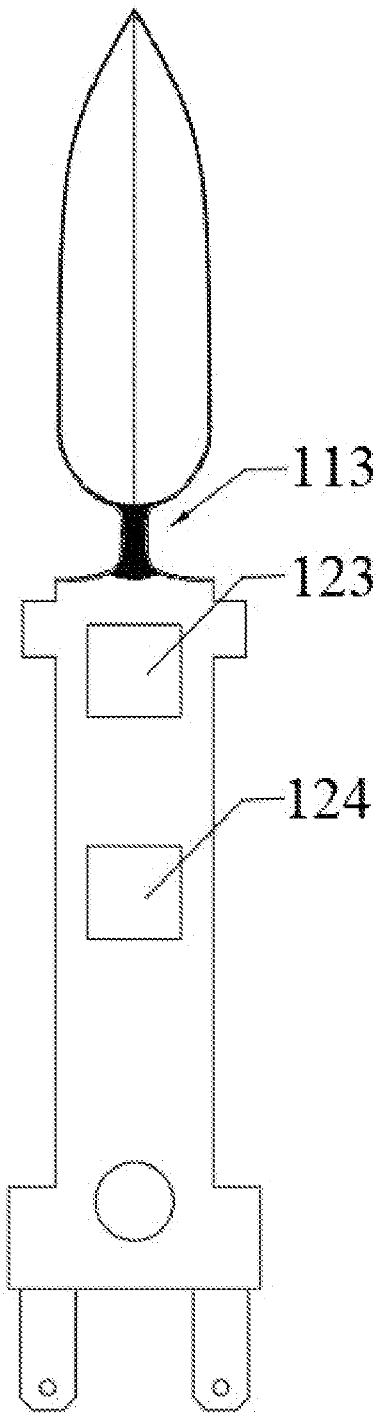
FIG. 6 is a schematic diagram of a candle wick part in the application of the present invention.

As another embodiment of the application of the present invention, referring to FIGS. 6 and 7, the wick part of the candle is further provided with a wick part 113. In this embodiment, the wick part 113 is set in black, so that the wick part 113 is similar to the wick part of a traditional candle, which makes the present invention more realistic. The wick part 113 is arranged between the substrate 120 and the light-emitting part 110 and is connected by an arc transition. The wick part 113 conducts power to the light-emitting part 110, so that the light-emitting part 110 can emit light.

Furthermore, both sides of the wick part 113 are covered with black encapsulation layers. In this embodiment, the encapsulation layer is the second epoxy resin encapsulation layer 114, which makes the cross section of the wick part 113 approximately circular, so as to be close to the shape of a real candle wick part.

In the preferred embodiment of the application of the present invention, referring to FIGS. 4 to 8, the candle lamp further includes a power supply component 130, which includes a support plate 131, wherein the support plate 131 is provided with a slot 122, and a pin 121 is provided below the substrate 120. The substrate 120 can be connected with the support plate 131 through the pin 121 and the slot 122, and the pin 121 is inserted into the slot 122. The pin 121 is a male connector and the slot 122 is a female connector. The support plate 131 is detachably connected with the substrate 120 through the slot 122 and supports and conducts power for the candle wick part. The power supply component 130 provides power for the candle wick part through the pin 121 and the slot 122.

Figure 9:
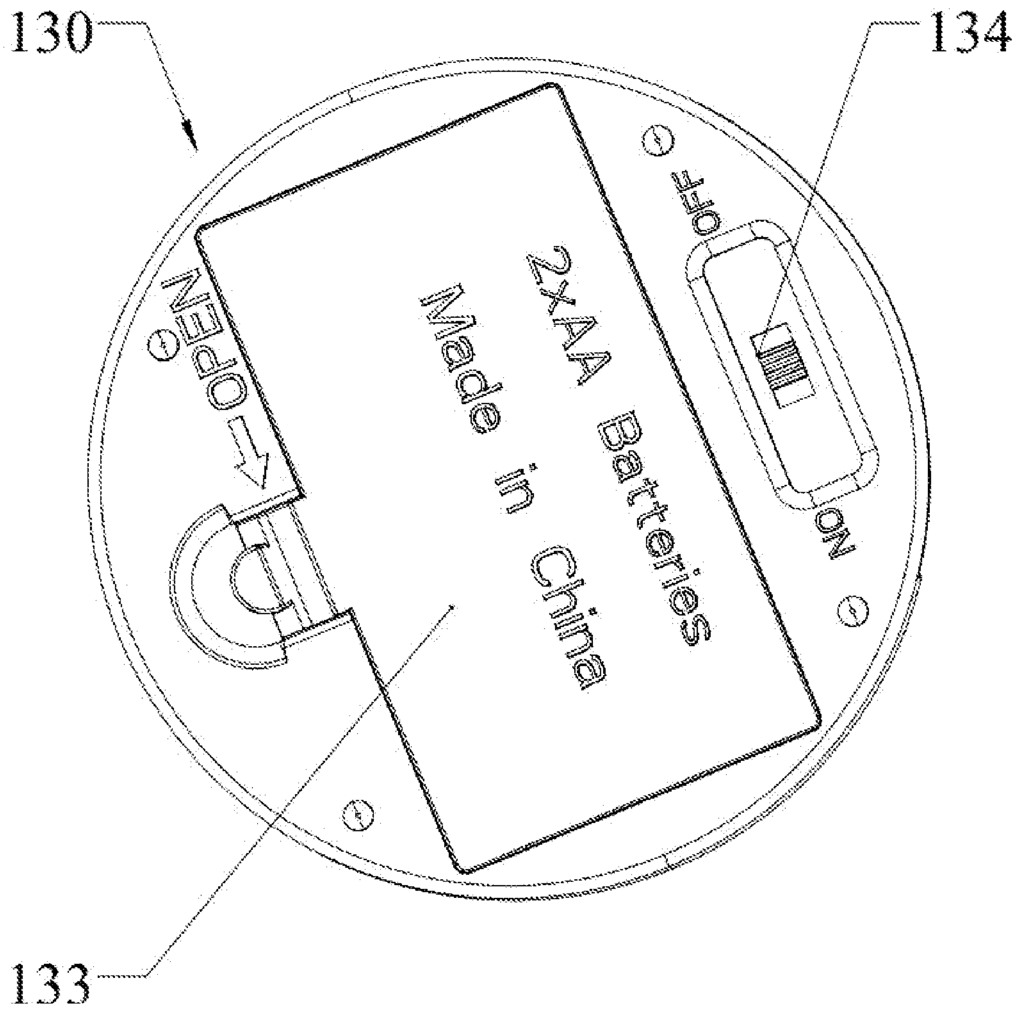
FIG. 9 is a schematic diagram of the power supply component in the application of the present invention.
Figure 10:
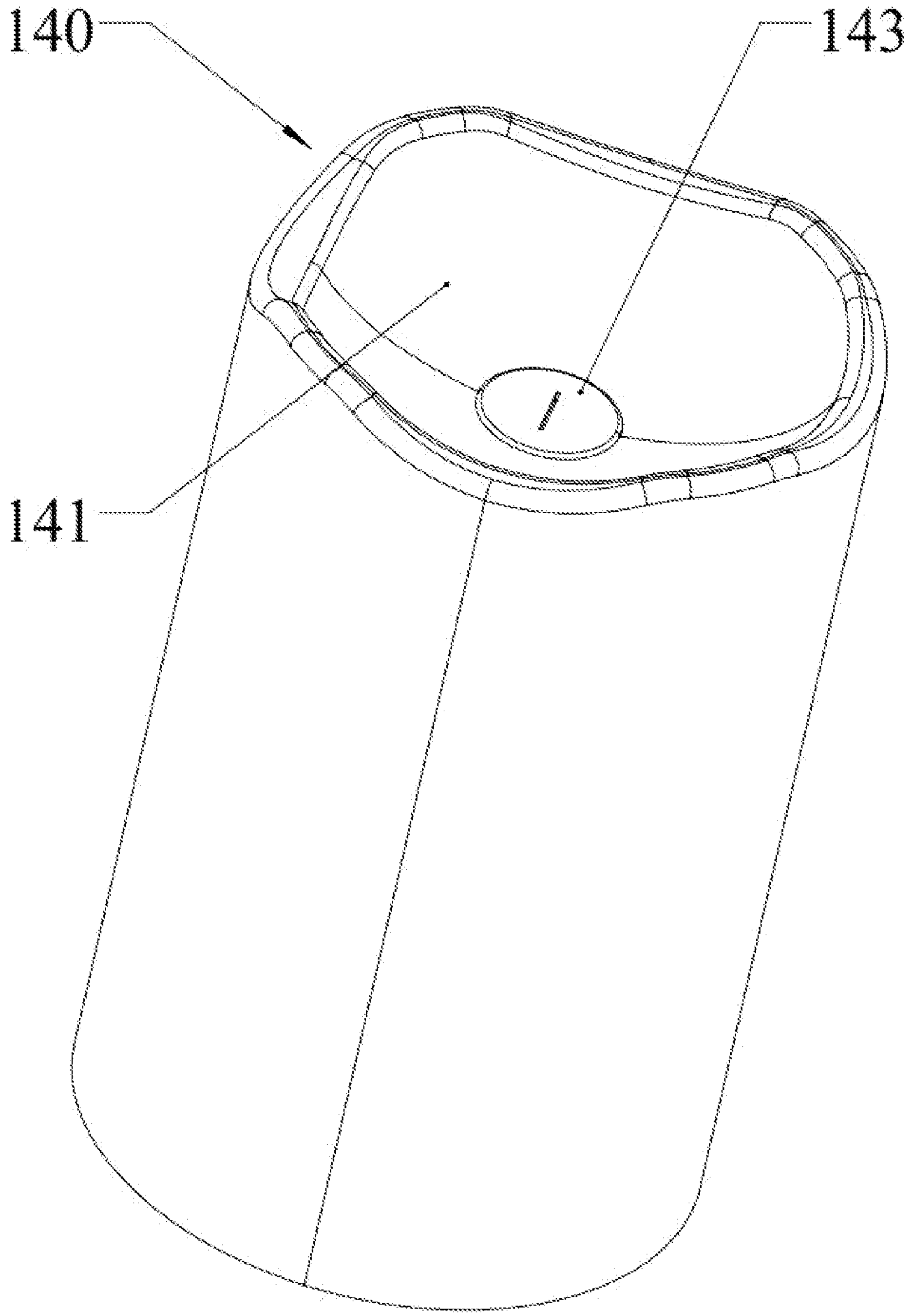
FIG. 10 is a schematic diagram of the main body in the application of the present invention.

Further, referring to FIGS. 9 and 10, the power supply component 130 further includes a power base 132, and the support plate 131 is connected with the power base 132 to conduct power to the candle wick part. At the same time, a battery compartment 133 and a power switch 134 are arranged below the power base 132 to supply power to the candle lamp as a whole.

In some alternative embodiments (not shown in the figure), the power supply includes but is not limited to storage batteries, sodium batteries, magnesium batteries, seawater batteries, glass batteries, fuel batteries, zinc-bromine batteries and other batteries or power supply sources.

In this embodiment, the power switch 134 is a push switch, which controls the turn-on and turn-off of the candle lamp. In other embodiments (not shown in the figure), the control mode may also include physical buttons, such as rocker, dial, slide switch, touch switch, toggle switch and joystick, click wheel, etc. In some alternative embodiments (not shown in the figure), the control mode can be coupled to any of the following (or decoupled): keyboard, infrared port, USB port and pointing device, such as mouse. In some embodiments (not shown in the figure), the control mode can also be electronic devices, such as touch screens, computer devices and other control system devices.

Figure 11:
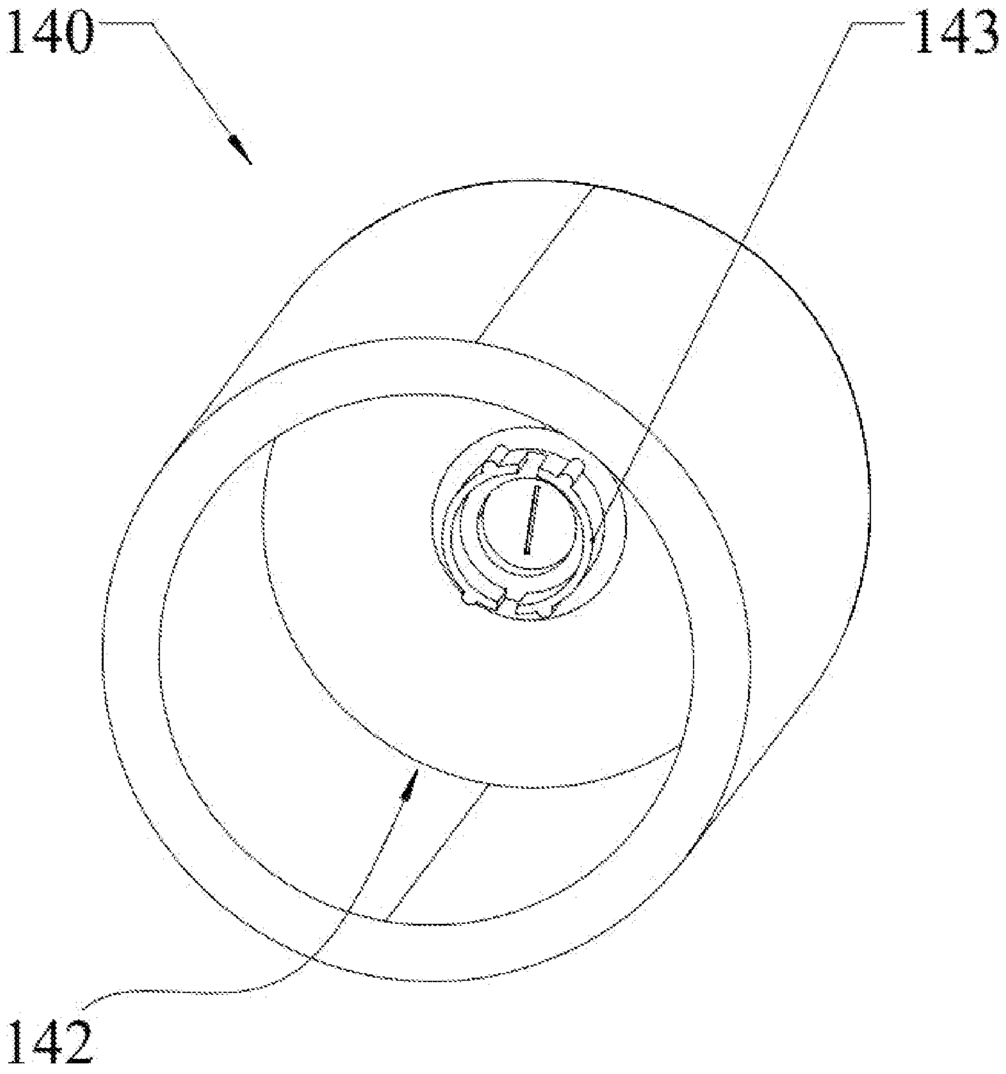
FIG. 11 is a schematic diagram of the main body in the application of the present invention.
Figure 12:
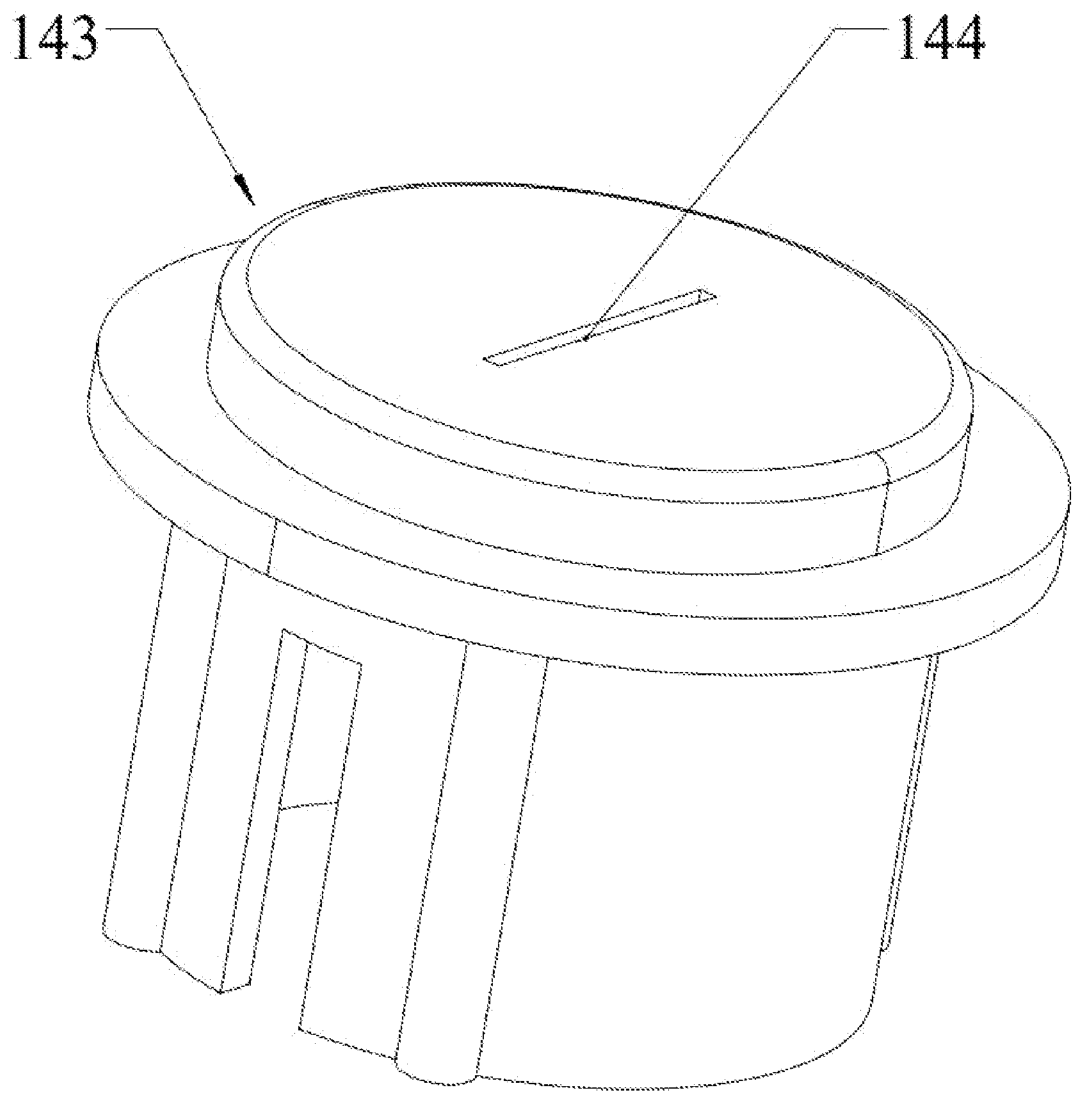
FIG. 12 is a schematic diagram of the fixing block in the application of the present invention.

In this preferred embodiment, referring to FIGS. 11 and 12, the candle lamp further includes a main body 140. The top of the main body 140 has an arc cavity 141. When the light-emitting part 110 of the candle wick part is lighted up, the arc cavity 141 can reflect and expand the light source, thus making the candle lamp brighter and increasing the visual effect. Meanwhile, the main body 140 is internally provided with a cavity 142 for placing a candle wick part, the candle wick part is placed in the cavity 142, and the light-emitting part 110 is exposed outside the middle of the arc-shaped concave cavity 141.

Further, as shown in FIG. 10 to FIG. 12, the main body 140 is embedded with a fixing block 143, which limits and fixes the candle wick part, and the fixing block 143 is provided with a through hole 144 through which the light-emitting part 110 is inserted.

In this embodiment, the fixing block 143 is made of an elastic material such as silica gel or rubber, manufactured by an integral molding process, and embedded in the top of the main body 140. In other embodiments, the fixing block 143 is formed by splicing, and the fixing block 143 has a symmetrical structure. The fixing block 143 is formed by splicing two parts. When assembling, the two parts are separated, the candle wick part is placed between the two parts and then the two parts are fastened, so that the candle wick part and the fixing block 143 are integrated into a whole.

In order to be more beautiful and increase the atmosphere, a light string may be arranged outside the main body 140.

According to the scheme of the present invention, the structure is simple, when the lamp bead chip 111 emits light, there is almost no graininess, and the light-emitting effect of the candle wick part is good and the simulation degree is high; at the same time, it is convenient to assemble; when the lamp bead chips 111 reach the service life and need to be replaced, the lamp panel 100 can be detached by separating the power base 132 from the main body 140, and the pins 121 of the broken lamp panel 100 can be pulled out from the slots 122, and then a new lamp panel 100 can be inserted. The operation is simple, and the whole candle lamp does not need to be discarded, saving resources.

In the broad sense of the present invention, candle lamps have many uses, including but not limited to: decorative lighting, which is often used to enhance the noble, elegant and warm atmosphere of space because of its beautiful appearance and simulation of real candle flame; home lighting, which can be used as the light source of home crystal chandeliers, and can also be used as nightlight for lighting; commercial lighting, which, in commercial places such as hotels and restaurants, is often used as the light source of crystal chandeliers or wall lamps; holiday decoration, which, in certain festivals such as Halloween and Christmas, can be used as decorative items.

At the same time, the candle lamp applied by the present invention also has many other advantages, such as energy saving: the energy consumption of candle lamp is only one tenth of that of incandescent lamp and one quarter of that of energy-saving lamp; long service life: the service life of candle lamp can exceed 100,000 hours; environmental protection: the candle lamp does not contain harmful substances such as mercury, and will not cause any damage to the environment; not attracting insects: the candle lamp does not contain infrared rays and ultraviolet rays during use, so it will not attract insects; strong decorative effect: because the candle lamp has a strong decorative effect due to its shape characteristics, it is widely used in the design of modern crystal lamps; not stroboscopic: the candle lamp works by pure DC, which eliminates the visual fatigue caused by stroboscopic of traditional light source; safe and reliable: the candle lamp works at low voltage, the surface temperature is ≤60° C. (when the ambient temperature is T=25° C.), safe and reliable; high luminous efficiency: the luminous efficiency of the candle lamp can be as high as 801 m/w, and various color temperatures can be selected, with high color rendering index and good color rendering; wide voltage range: the candle lamp has a constant current in the full voltage range of 85V-264 VAC, which ensures that the life and brightness are not affected by voltage fluctuation; impact resistance, strong lightning resistance: the candle lamp without filament and glass shell, no traditional lamp tube fragmentation problem, no harm to human body, no radiation and other advantages.

To sum up, the candle lamp provided by the present invention not only has a candle shape, but also has a flame dynamic effect, and also has various advantages such as almost no graininess, simple structure, easy production and maintenance, etc., so that the viewing effect of the candle lamp is good, thereby further improving the user's experience.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A candle wick part comprising a lamp panel, wherein, said lamp panel comprises a substrate and a light-emitting part; and said light-emitting part is arranged at one end of said substrate, and a width of an upper part of said light-emitting part is gradually reduced from bottom to top;

wherein, a plurality of lamp bead chips is arranged on one side of said light-emitting part, and said lamp bead chips are covered with an epoxy resin encapsulation layer, said epoxy resin encapsulation layer is translucent;

wherein said epoxy resin encapsulation layer is flexible; and said light-emitting part, said lamp bead chips and said epoxy resin encapsulation layer are closely combined without gaps;

wherein, a wick part is also arranged between said substrate and said light-emitting part;

wherein said lamp bead chips have different switching times and are lighted up to form a fire shape;

wherein both sides of said wick part are covered with black epoxy resin;

wherein a cross section of said wick part is approximately circular; and wherein said wick part connects said substrate and said light-emitting part by an arc transition.

2. The candle wick part according to claim 1, wherein said substrate is provided with a control chip for controlling said lamp bead chips; and pins are arranged at said bottom of said substrate.

3. The candle wick part according to claim 1, wherein the other surface of said light-emitting part is covered with a translucent epoxy resin encapsulation layer and said epoxy resin encapsulation layer is high in a middle part and low in a periphery.

4. The candle wick part according to claim 1, wherein a plurality of lamp bead chips is arranged on both surfaces of said light-emitting part and said lamp bead chips on both surfaces are arranged in a staggered manner.

5. The candle wick part according to claim 1, wherein a width of a lower part of said light-emitting part gradually decreases from top to bottom, and a concave part is formed at a transition with said substrate.

6. The candle wick part according to claim 2, wherein said substrate is further provided with a signal receiving chip and said signal receiving chip can receive a signal sent by a remote-control device and transmit the signal to said control chip to realize remote control.

* * * * *